US009785571B2

(12) United States Patent
Shiu

(10) Patent No.: US 9,785,571 B2
(45) Date of Patent: Oct. 10, 2017

(54) METHODS AND SYSTEMS FOR MEMORY DE-DUPLICATION

(71) Applicant: GOOGLE INC., Mountain View, CA (US)

(72) Inventor: Shinye Shiu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 14/877,523

(22) Filed: Oct. 7, 2015

(65) Prior Publication Data
US 2016/0098353 A1 Apr. 7, 2016

Related U.S. Application Data
(60) Provisional application No. 62/060,949, filed on Oct. 7, 2014.

(51) Int. Cl.
*G06F 12/10* (2016.01)
*G06F 12/1009* (2016.01)
(Continued)

(52) U.S. Cl.
CPC .......... *G06F 12/1009* (2013.01); *G06F 3/061* (2013.01); *G06F 3/0604* (2013.01); *G06F 3/0638* (2013.01); *G06F 3/0653* (2013.01); *G06F 3/0656* (2013.01); *G06F 3/0673* (2013.01); *G06F 3/0683* (2013.01); *G06F 12/0891* (2013.01); *G06F 12/0897* (2013.01); *G06F 12/1027* (2013.01); *G06F 12/12* (2013.01); *G06F 12/0802* (2013.01); *G06F 12/0864* (2013.01); *G06F 12/121* (2013.01); *G06F 2212/1016* (2013.01); *G06F 2212/1044* (2013.01); *G06F 2212/401* (2013.01); *G06F 2212/502* (2013.01); *G06F 2212/601* (2013.01);
(Continued)

(58) Field of Classification Search
None
See application file for complete search history.

(56) References Cited

U.S. PATENT DOCUMENTS

| 5,544,349 A | 8/1996 | Berry et al. |
| 5,699,539 A | 12/1997 | Garber et al. |

(Continued)

OTHER PUBLICATIONS

International Search Report and Written Opinion for corresponding application No. PCT/US2015/054491 dated Dec. 4, 2015.
(Continued)

*Primary Examiner* — Kevin Verbrugge
(74) *Attorney, Agent, or Firm* — Colby Nipper

(57) ABSTRACT

Provided are methods and systems for de-duplicating cache lines in physical memory by detecting cache line data patterns and building a link-list between multiple physical addresses and their common data value. In this manner, the methods and systems are applied to achieve de-duplication of an on-chip cache. A cache line filter includes one table that defines the most commonly duplicated content patterns and a second table that saves pattern numbers from the first table and the physical address for she duplicated cache line. Since a cache line duplicate can be detected during a write operation, each write can involve table lookup and comparison. If there is a hit in the table, only the address is saved instead of the entire data string.

18 Claims, 7 Drawing Sheets

(51) Int. Cl.
  *G06F 3/06* (2006.01)
  *G06F 12/0891* (2016.01)
  *G06F 12/12* (2016.01)
  *G06F 12/0897* (2016.01)
  *G06F 12/1027* (2016.01)
  *G06F 12/0802* (2016.01)
  *G06F 12/0864* (2016.01)
  *G06F 12/121* (2016.01)

(52) U.S. Cl.
  CPC .... *G06F 2212/604* (2013.01); *G06F 2212/65* (2013.01); *G06F 2212/68* (2013.01); *G06F 2212/683* (2013.01); *G06F 2212/69* (2013.01); *Y02B 60/1225* (2013.01)

(56) References Cited

U.S. PATENT DOCUMENTS

| | | | |
|---|---|---|---|
| 5,978,888 | A | 11/1999 | Arimilli et al. |
| 5,991,847 | A | 11/1999 | Ballard et al. |
| 6,434,669 | B1 | 8/2002 | Arimilli et al. |
| 6,532,520 | B1 | 3/2003 | Dean et al. |
| 6,556,952 | B1 | 4/2003 | Magro |
| 6,877,081 | B2 | 4/2005 | Herger et al. |
| 7,000,074 | B2 | 2/2006 | Wootton |
| 7,185,155 | B2 | 2/2007 | Sechrest et al. |
| 7,383,399 | B2 | 6/2008 | Vogt |
| 7,844,793 | B2 | 11/2010 | Herger et al. |
| 8,375,191 | B2 | 2/2013 | Kim |
| 8,458,404 | B1 | 6/2013 | Delgross et al. |
| 8,484,405 | B2 | 7/2013 | Mashtizadeh et al. |
| 8,516,005 | B2 | 8/2013 | Ergan et al. |
| 9,311,250 | B2 * | 4/2016 | Van De Ven ......... G06F 12/109 |
| 9,740,631 | B2 | 8/2017 | Shiu |
| 2002/0073298 | A1 | 6/2002 | Geiger et al. |
| 2002/0147893 | A1 | 10/2002 | Roy et al. |
| 2002/0184579 | A1 | 12/2002 | Alvarez et al. |
| 2003/0061457 | A1 | 3/2003 | Geiger et al. |
| 2003/0221072 | A1 | 11/2003 | Azevedo et al. |
| 2006/0136671 | A1 | 6/2006 | Balakrishnan et al. |
| 2006/0179258 | A1 | 8/2006 | Dooley et al. |
| 2010/0281216 | A1 | 11/2010 | Patel et al. |
| 2011/0289277 | A1 | 11/2011 | Takada et al. |
| 2012/0191667 | A1 | 7/2012 | Kopylovitz et al. |
| 2013/0073798 | A1 | 3/2013 | Kang et al. |
| 2013/0326115 | A1 | 12/2013 | Goss et al. |
| 2014/0075118 | A1 | 3/2014 | Biswas et al. |
| 2014/0075137 | A1 | 3/2014 | Shin |
| 2014/0089600 | A1 | 3/2014 | Biswas et al. |
| 2014/0201456 | A1 | 7/2014 | Gibson et al. |
| 2014/0281235 | A1 | 9/2014 | Liu |
| 2014/0289476 | A1 | 9/2014 | Nayak |
| 2014/0304484 | A1 | 10/2014 | Clifton et al. |
| 2015/0178214 | A1 * | 6/2015 | Alameldeen ........ G06F 12/0875 711/125 |
| 2015/0186282 | A1 * | 7/2015 | Rahme ................. G06F 1/3225 711/103 |
| 2016/0098193 | A1 | 4/2016 | Shiu |
| 2016/0098356 | A1 | 4/2016 | Shiu |
| 2016/0291891 | A1 * | 10/2016 | Cheriton ............. G06F 21/6218 |

OTHER PUBLICATIONS

International Search Report & Written Opinion, dated Dec. 18, 2015, in relation application No. PCT/US2015/054496.
International Search Report & Written Opinion, dated Nov. 19, 2015, in related application No. PCT/US2015/054499.
Tian et al., "Last-Level Cache Deduplication," Supercomputing ACM, NY NY (Jun. 10, 2014), pp. 53-62.
"International Preliminary Report on Patentability", Application No. PCT/US2015/054499, Apr. 20, 2017, 10 pages.
"International Preliminary Report on Patentability", Application No. PCT/US2015/054496, Apr. 20, 2017, 7 pages.
"International Preliminary Report on Patentability", Application No. PCT/US2015/054491, Apr. 20, 2017, 8 pages.
"Non-Final Office Action", U.S. Appl. No. 14/877,484, Jan. 26, 2017, 7 pages.
"Non-Final Office Action", U.S. Appl. No. 14/877,629, Feb. 9, 2017, 8 pages.
"Final Office Action", U.S. Appl. No. 14/877,629, dated Jun. 22, 2017, 8 pages.
"Notice of Allowance", U.S. Appl. No. 14/877,484, dated May 15, 2017, 5 pages.

* cited by examiner

FIG. 3

METHODS AND SYSTEMS FOR MEMORY DE-DUPLICATION

The present application claims priority to U.S. Provisional Patent Application Ser. No. 62/060,949, filed Oct. 7, 2014, the entire disclosure of which is hereby incorporated by reference.

BACKGROUND

It has been observed that there are often many duplicated cache lines in the memory of an operating system. Although it is possible for software to scan memory and detect duplicated content, using software in such a manner is often very expensive. Instead, a more economical and efficient approach is to use hardware to detect data patterns in the memory.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for managing memory. More specifically, aspects of the present disclosure relate to de-duplicating cache lines in a memory by detecting cache line data patterns and building a link-list between multiple physical addresses and then common data value.

One embodiment of the present disclosure relates to a method for de-duplicating cache lines comprising: detecting a data pattern in a write to a cache line; determining whether a physical address of the write matches an entry in a last level cache; determining whether the data pattern in the write matches a data pattern associated with the entry; and in response to determining that the physical address of the write matches an entry in the last level cache, and that the data pattern in the write matches a data pattern associated with the entry. Invalidating the entry in the last level cache.

In another embodiment, the method for de-duplicating cache lines further comprises, in response to determining that the physical address of the write matches an entry in the last level cache, and that the data pattern in the write matches a data pattern associated with the entry, allocating a new entry for the write in a table of a corresponding cache line filter.

In another embodiment, the method for de-duplicating cache lines further comprises, in response to determining that the physical address of the write matches an entry in the last level cache, and that the data pattern in the write is different from the data pattern associated with the entry, updating the entry in the last level cache with the data pattern of the write.

In yet another embodiment, the method for de-duplicating cache lines further comprises, in response to determining chat the physical address of the write is different than all entries in the last level cache, and that the data pattern in the write matches a data pattern associated with an entry in the last level cache, allocating a new entry for the write in a table of a corresponding cache line filter.

In still another embodiment, the method for de-duplicating cache lines further comprises, in response to determining that the physical address of the write is different than ail entries in the last level cache, and that the data pattern in the write is different than all data patterns associated with the entries in the last level cache, writing a new entry for the write in the last level cache.

Another embodiment of the present disclosure relates to a system for de-duplicating cache lines, the system comprising a least one processor and a non-transitory computer-readable medium coupled to the at least one processor having instructions stored thereon that, when executed by the at least one processor, causes the at least one processor to: detect a data pattern in a write to a cache line; determine whether a physical address of the write matches an entry in a last level cache; determine whether the data pattern in the write matches a data pattern associated with the entry; and in response to determining that the physical address of the write matches an entry in the last level cache, and that the data pattern in the write matches a data pattern associated with the entry, invalidate the entry in the last level cache.

In another embodiment, the at least one processor in the system for de-duplicating cache lines is further caused to, in response to determining that the physical address of the write matches an entry in the last level cache, and that the data pattern in the write matches a data pattern associated with the entry, allocate a new entry for the write in a table of a corresponding cache line filter.

In another embodiment, the at least one processor in the system for de-duplicating cache lines is further caused to, in response to determining that the physical address of the write matches an entry in the last level cache, and that the data pattern in the write is different from the data pattern associated with the entry, update the entry in the last level cache with the data pattern of the write.

In yet another embodiment, the at least one processor in the system for de-duplicating cache lines is further caused to, in response to determining that the physical address of the write is different than all entries in the last level cache, and that the data pattern in the write matches a data pattern associated with an entry in the last level cache, allocate a new entry for tire write in a table of a corresponding cache line filter.

In still another embodiment, the at least one processor in the system for de-duplicating cache lines is further caused to, in response to determining that the physical address of the write is different than all entries in the last level cache, and that the data pattern in the write is different than all data patterns associated with the entries in the last level cache, write a new entry for the write in the last level cache.

Yet another embodiment of the present disclosure relates to a method for de-duplicating cache lines during a memory read operation, the method comprising: performing a lookup in a table of an on-chip cache line filter; determining, based on the lookup, whether data associated with a read request is available in the cache line filter; in response to determining that the data associated with the read request is available in the cache line filter, obtaining the data from the cache line filter; and in response to determining that the data associated with the read request is not available in the cache line filter, obtaining the data from a last level cache.

In another embodiment, the method for de-duplicating cache lines during a memory read operation further comprises, in response to determining that the data associated with the read request is not available in the cache line filter, performing a lookup in a working memory cache overflow table.

In yet another embodiment, the method for de-duplicating cache lines during a memory read operation further comprises, determining, based on the lookup, that the data, associated with the read request is duplicated data contained in the working memory cache.

In still another embodiment, the method for de-duplicating cache lines during a memory read operation further comprises, determining, based on the lookup, that the data associated with the read request is present in the working memory cache; and obtaining the data from the working memory cache.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

FIG. 3 is a block diagram illustrating an example off-chip memory overflow table according to one or more embodiments described herein.

Figure 1:
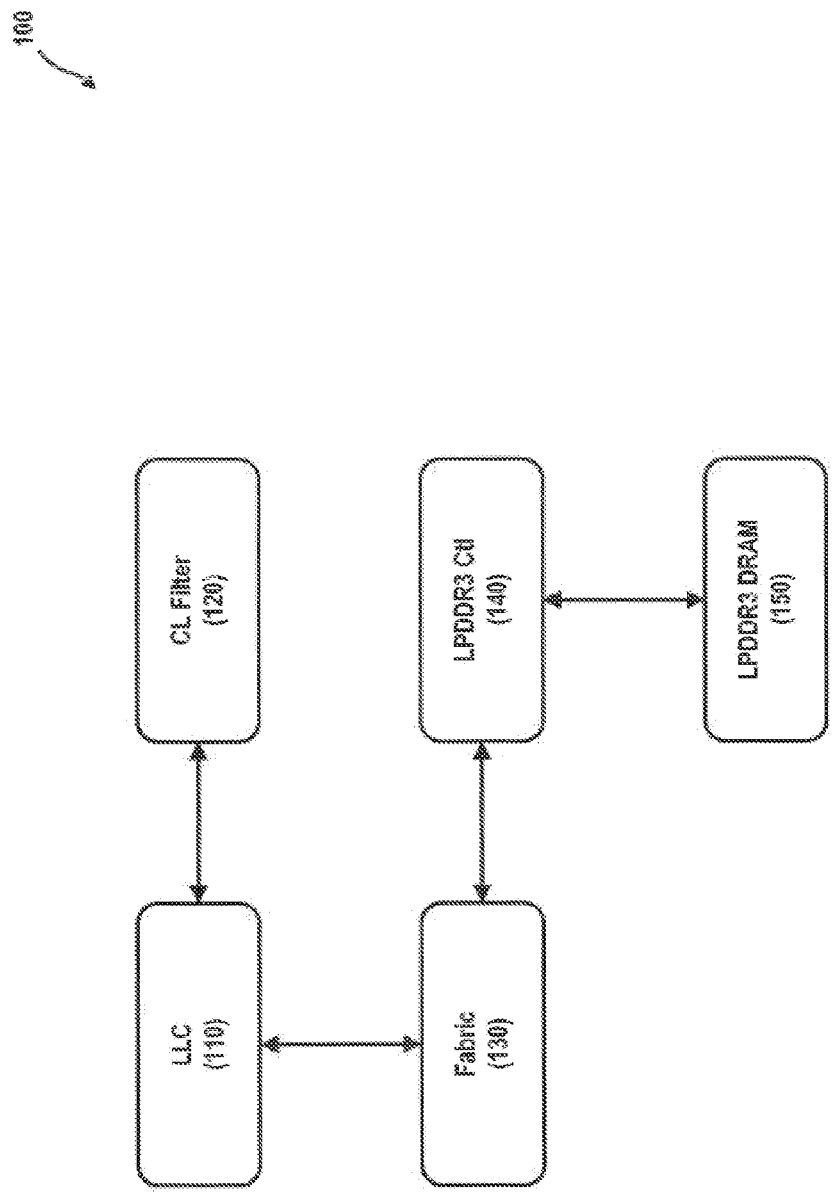
FIG. 1 is a block diagram illustrating an example system for de-duplication of cache lines in a memory according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many otter obvious features not described in detail herein. Additionally, some well-known structures or functions may not be shown or described in detail below, so as to avoid unnecessarily obscuring the relevant description.

Embodiments of the present disclosure relate to methods and systems for de-duplicating cache lines in physical memory by detecting cache line data patterns and building a link-list between multiple physical addresses and their common data value. In this manner, for example, 64 byte data may be replaced with 32-bit (4 byte) address. In accordance with at least one embodiment, the methods and systems may be applied to achieve de-duplication of an on-chip cache.

As mentioned above, hardware is good at detecting cache line data patterns. For example, cache line data patterns may be detected using digital logic gates (e.g., XOR gates) and hardwired-derived, software-defined, and/or hard ware-trained patterns.

FIG. 1 is an example system for memory de-duplication 100. In accordance with one or more embodiments described herein, the system 100 may include a last level cache (LLC) 110, a cache line filter (CL Filter) 120, fabric 130, a low-power double data rate memory controller (e.g., LPDDR3 Ctl) 140, and physical dynamic random access memory (DRAM) with LPDDR3 interlace standard 150.

In accordance with at least one embodiment LLC 110 may be, for example, 8 MB on-chip static random access memory (SRAM), and CL Filter 120 may be the cache line niter that detects a duplicated data pattern and maintains the address-data mapping instead of writing the duplicated data into the cache memory. Fabric 130 is the on-chip interconnect that moves command/packets between various agents (e.g., components, elements, etc.) of the system, including, for example, CPU, GPU, on-chip SRAM cache, off-chip DRAM, etc. Also, LPDDR3 Ctl 140 is a memory controller that interlaces with JEDEC LPDDR3 DRAM.

Figure 2:
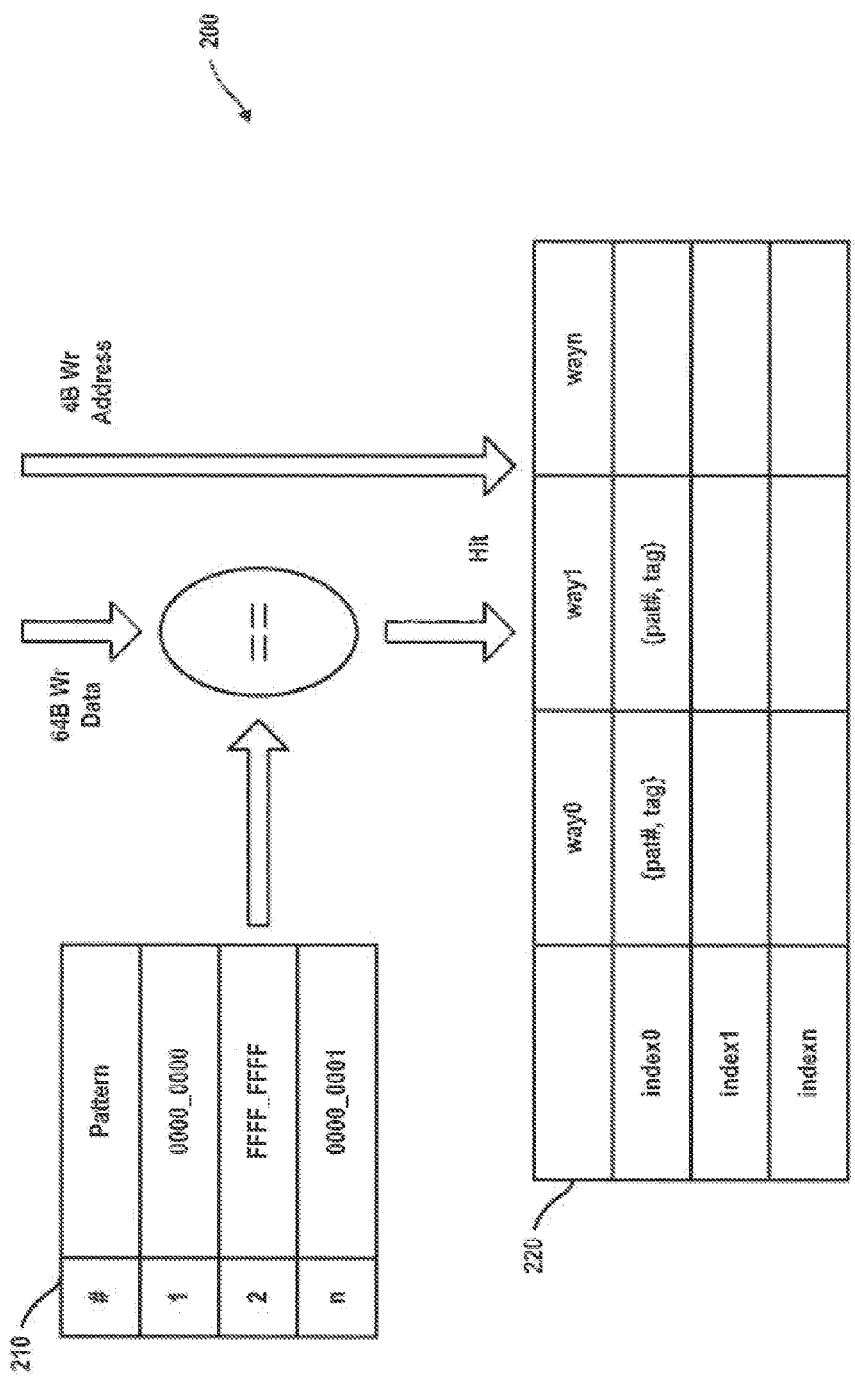
FIG. 2 is a block diagram illustrating an example on-chip cache line filter table according to one or more embodiments described herein.

FIG. 2 shows an example of an on-chip Cache Line Filter Table (CL Filter Table) 200. In accordance with one or more embodiments described herein, the CL Filter Table 200 may form a part of and/or be utilized by a CL Filter (e.g., CL Filter 120 in the example system shown in FIG. 1).

As shown, in accordance with at least one embodiment of the present disclosure, two data structures may be used to constitute the CL Filter Table 200. For example, there may be one table 210 that defines the most commonly duplicated content patterns (e.g., 16-64 entries in the pattern register). A second table 220 may save pattern numbers from the first table 210 and the physical address for the duplicated cache line.

A cache line duplicate may be detected during a write operation. Thus, each write may involve table lookup and comparison. If there is a hip only the address is saved instead of she entire data string. De-duplicated data is not in LLC (e.g., LLC 110 in the example system 100 shown in FIG. 1), it is only in table 220. For example, assuming that table 220 has 16K entries and each entry has 48 payload for pattern number and physical address, then table 220 would cover up to 1 MB worth of duplicated content.

In accordance with one or more embodiments, a new entry may be allocated to the CL Filter Table 200 (e.g., the data structure represented by table 220) when, for example, there is a pattern hit and it is determined that it is a new write address. For example, a new write address may be determined (e.g., identified) by comparing the address against the LLC tag (where the "tag" is address of the whole cache line). An existing address will match the LLC tag while a new address will not. Furthermore, an entry in the CL filter Table 200 may be updated/invalidated when it is determined that an old write has a new pattern. For example, if old write data is found in the LLC, but the new write data is, for example, "0000," then data may be moved from the LLC into the CL Filter Table 200. Such an occurrence is treated as an overwrite of an old cache entry.

In accordance with at least one embodiment, an entry in CL Filter Table 200 may be evicted (e.g., removed) and moved to a DRAM Overflow Table when a "way" conflict occurs (further details about the DRAM Overflow Table and "way" conflicts will be provided below). It should be understood that the CL Filter Table 200 is an on-chip structure, and thus space is limited. Accordingly, an entry in the CL Filter Table 200 may be evicted to the DRAM Overflow Table when, for example, capacity is reached. Since the most recently written entries in CL Filter Table 200 have the highest probability of being read, the oldest entries in the CL Filter Table 200 are likely to be the first entries exacted to the Dram Overflow Table. No duplicated content in the LLC (e.g., LLC 110 in the example system 100 shown in FIG. 1).

As used herein, "n-way" means that an address can be partitioned into two fields—an "index" field and a "way" field (as represented by the columns and rows in table 220 of the example CL Filter Table 200 shown in FIG. 2). The index field is based on the number of entries to be allocated (e.g., depth of the cache). In addition, the cache line offset is based on the size of the cache line.

In the context of the way index, for example, "4-ways" indicates that up to four unique tags can be accommodated, where a tag is the value of any box in the table defined by depth and width entries. As such, a 4-way cache can be understood to mean that four unique tags are allowed in any table entry. In this sense, a way conflict may arise, for example, when there is a fifth tag trying to go into an index.

Figure 3:
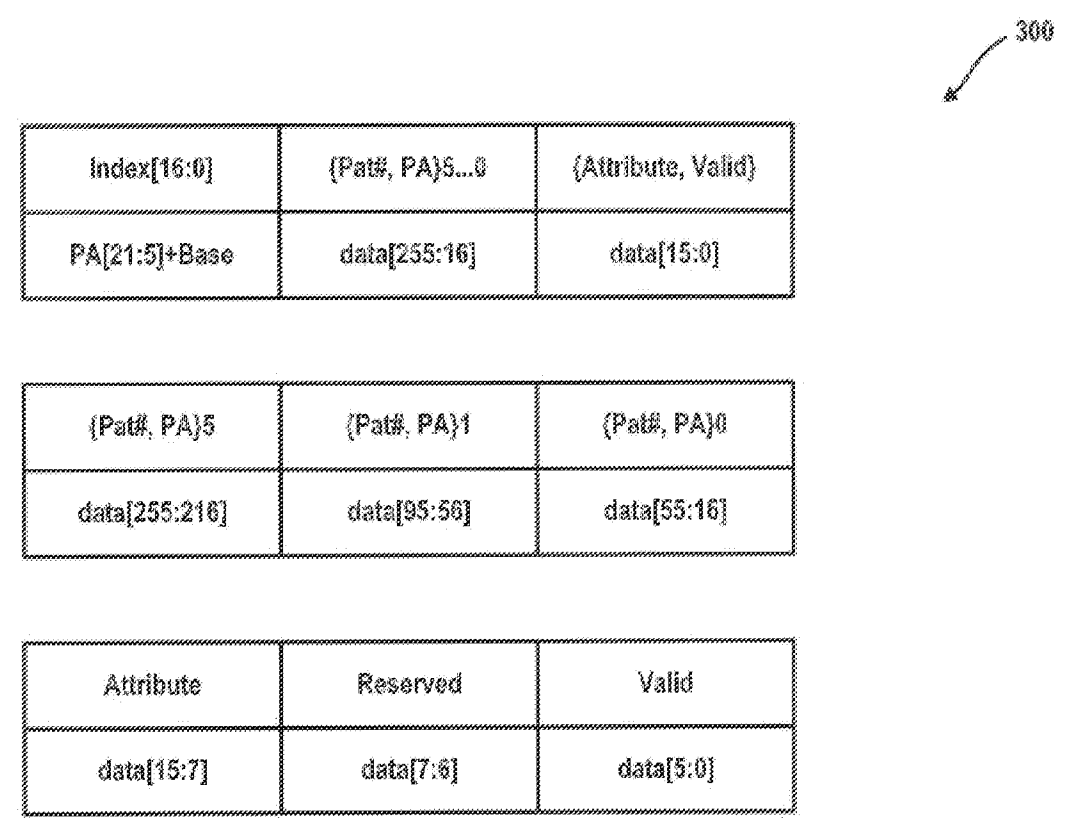

FIG. 3 is an example of an off-chip memory (e.g., DRAM) Overflow Table 300 in accordance with one or more embodiments described herein.

The DRAM Overflow Table 300 extends the on-chip SRAM concept to tree up additional levels of DRAM cache space. For example, a 4 MB Dram Overflow Table can free up 64 MB of DRAM cache space. It should be noted that the DRAM Overflow Table 300 is slower than on-chip SRAM. On-chip SRAM space is in MB range. DRAM cache can be in the hundreds of MB range. Order of magnitude higher time/cost. Although the DRAM Overflow Table 300 does not necessarily provide speed benefit, it does make the cache footprint look bigger than its physical size. Performance is about the same as an un-optimized cache because the CL Filter Table (e.g., CL Filter Table 200 as shown in FIG. 2) is always faster than cache, even if in DRAM.

The DRAM Overflow Table 300 applies the de-duplication concept to the DRAM memory cache. For example, in accordance with at least one embodiment, the DRAM Overflow Table (128K entries×32 B payload) serves as a back-up to on-chip cache line biter. Depending on the implementation, the Dram Overflow fable can cover up to 64 MB worth of duplicated content. It should be noted that the hash function can be used to spread out the entry index to avoid conflicts and randomize the incoming address. Physical address is 32 bits, hash is 17 bits. Therefore, hash generates a semi-random index by using additional bits from the 31-6 of the tag. Randomization is good because otherwise only specific indexes are written, so this way more indexes are used to spread out the index field.

In accordance with at least one embodiment of the present disclosure, the DRAM Overflow Table 300 may optionally be used as a hardware garbage collector. For example, software may occasionally do a context switch and clean up the page table so that the duplicated address is no longer valid in the DRAM Overflow Table. Thus, when there is a possibility that software may clean up certain pages, periodic garbage collection may be performed in order to clean up attributes and re-set every valid bit. For example. A "dirty" data may be written back to memory since it is not known whether such data is in the current page or not. The page table needs to be consistent with software data. As such, for any pages that are invalidated from memory, no dirty data is written back, in this manner, garbage collection allows the cache and main memory to be synchronized.

Figure 4:
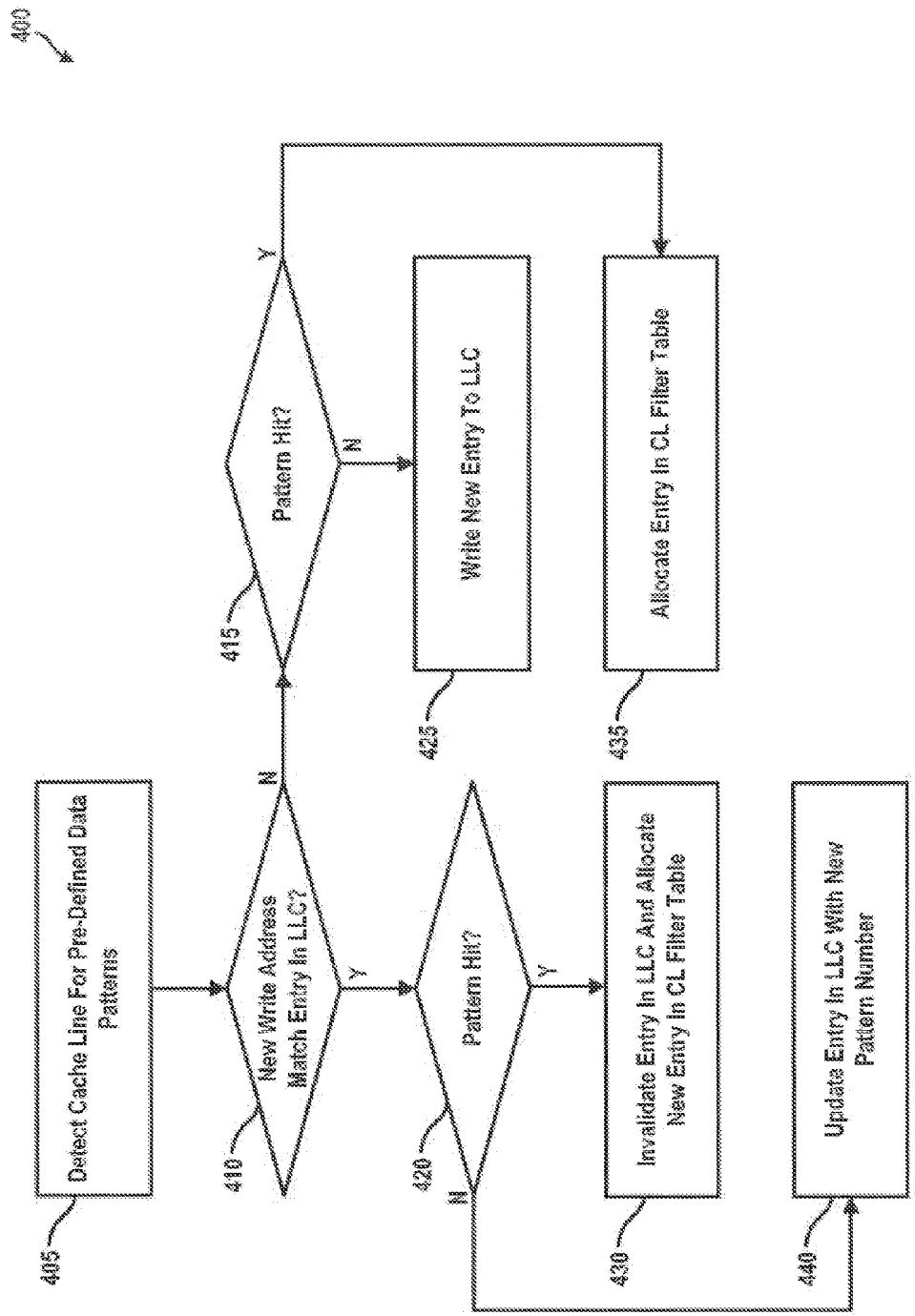
FIG. 4 is a flowchart illustrating an example method for memory de-duplication during a write operation according to one or more embodiments described herein.
Figure 5:
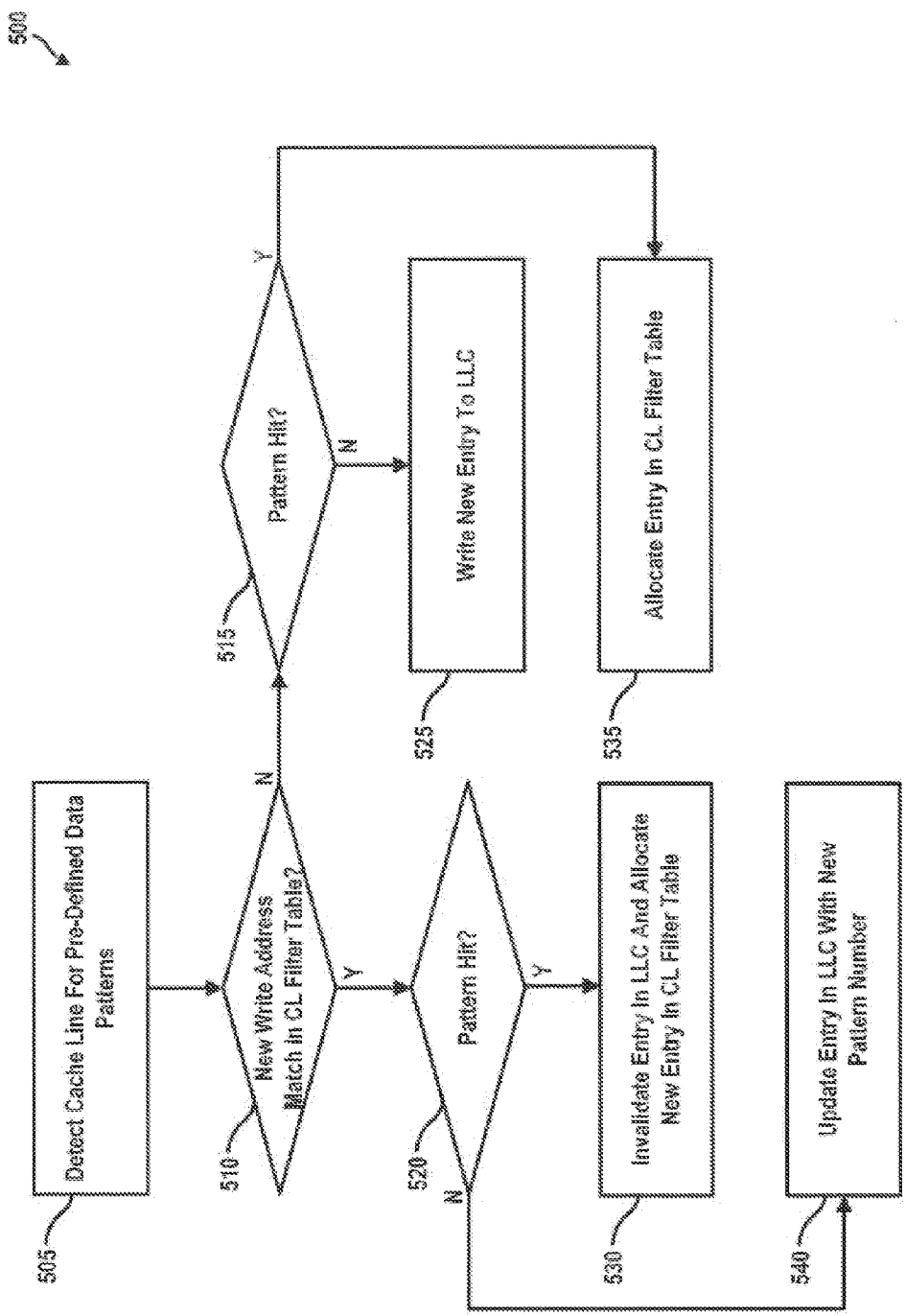
FIG. 5 is a flowchart illustrating another example method for memory de-duplication during a write operation according to one or more embodiments described herein.

FIGS. 4 and 5 illustrate example processes for de-duplication during memory write operations in accordance with one or more embodiments described herein. As shown in the example processes 400 and 500, depending on whether a hit is found (e.g., determined, identified, etc.) in only the pattern, in only the physical address, in both the pattern and physical address, or in neither the pattern, in only the physical address, different operations may be performed with respect to the LLC and/or the CL Filter Table (e.g., LLC 110 in the example system 100 shown in FIG. 1 and/or example CL Filter Table 200 shown in FIG. 2, each of which are described in detail above). Various details about one or more of blocks 405-440 and 505-540 in the example processes 400 and 500 for memory de-duplication during a write operation are provided below.

It should be noted that while many of the blocks included in the example process for de-duplication 400 shown in FIG. 4 are similar to corresponding blocks in the example process for de-duplication 500 shown in FIG. 5, blocks 410 and 510 represent two separate cases that may apply in accordance with one or more embodiments described herein. In particular, at block 410 of the example process 400 it may be determined whether the new write address matches an entry in the LLC, while at block 510 of the example process 500 it may be determined whether the new write address matches an entry in the CL Filter Table.

For example, if a new write address hits an existing entry on physical address, but the write data is a different pattern, then it can be determined that there is a prior write with one of the predefined patterns. Hence, an entry was allocated in the CL filter Table already. In such an occurrence it is only necessary to update the pattern number (e.g., all zeros) with the new pattern being written (e.g., all 1's).

In the instance where there is already an entry in the LLC, but the new write data matches one of the pre-defined patterns (e.g., all 1's), then the LLC entry may be invalidated and a new entry allocated in the CL Filter Table.

If an overwrite of an existing CL Filter address results in unique data, the CL Filter Table entry is invalidated and a write to the LLC proceeds.

As described above, a physical address hit means there is a prior write with one of the predefined patterns. If it is a unique pattern, the entry in the CL Filter Table is invalidated and there is instead a write to the LLC. On the other hand, if it is a different pattern, then the entry in the CL Filter Table is updated with the new pattern number.

When there is a pattern hit, an entry is allocated to the CL Filter Table only if there is no physical address hit. The reason for this is because otherwise it means CPU is just trying to write the same data again. If there is no physical address hit or pattern hit, then the process continues with a write to the LLC.

If new write data is duplicated, the LLC entry is invalidated and moved to CL Filter Table (allocate new CL Filter Table entry because if in LLC then can be no physical address hit).

In accordance with one or more embodiments of the present disclosure, where DRAM is being used, it may be necessary to implement RMW (read-modify-write) on the DRAM Overflow Table (e.g., DRAM Overflow Table 300 as shown in FIG. 3), for example, {pattern #, physical address}, if the on-chip CL Filter Table entry is full (not shown in FIG. 4). In such a scenario, the DRAM Overflow Table is checked, entries are modified, and then a new entry written to the table (e.g., if on-chip CL Filter Table is full).

The CL Filter Table and the LLC may be checked in parallel (e.g., at the same time). If on-chip CL is full, then is possible that DRAM Overflow Table has this data. Read based on index, check for match (modify), and then either invalidate or write to LLC and write status back to DRAM overflow. The write action is the same as for CL filter table. Overflow is just a bigger table for CL fitter data.

Figure 6:
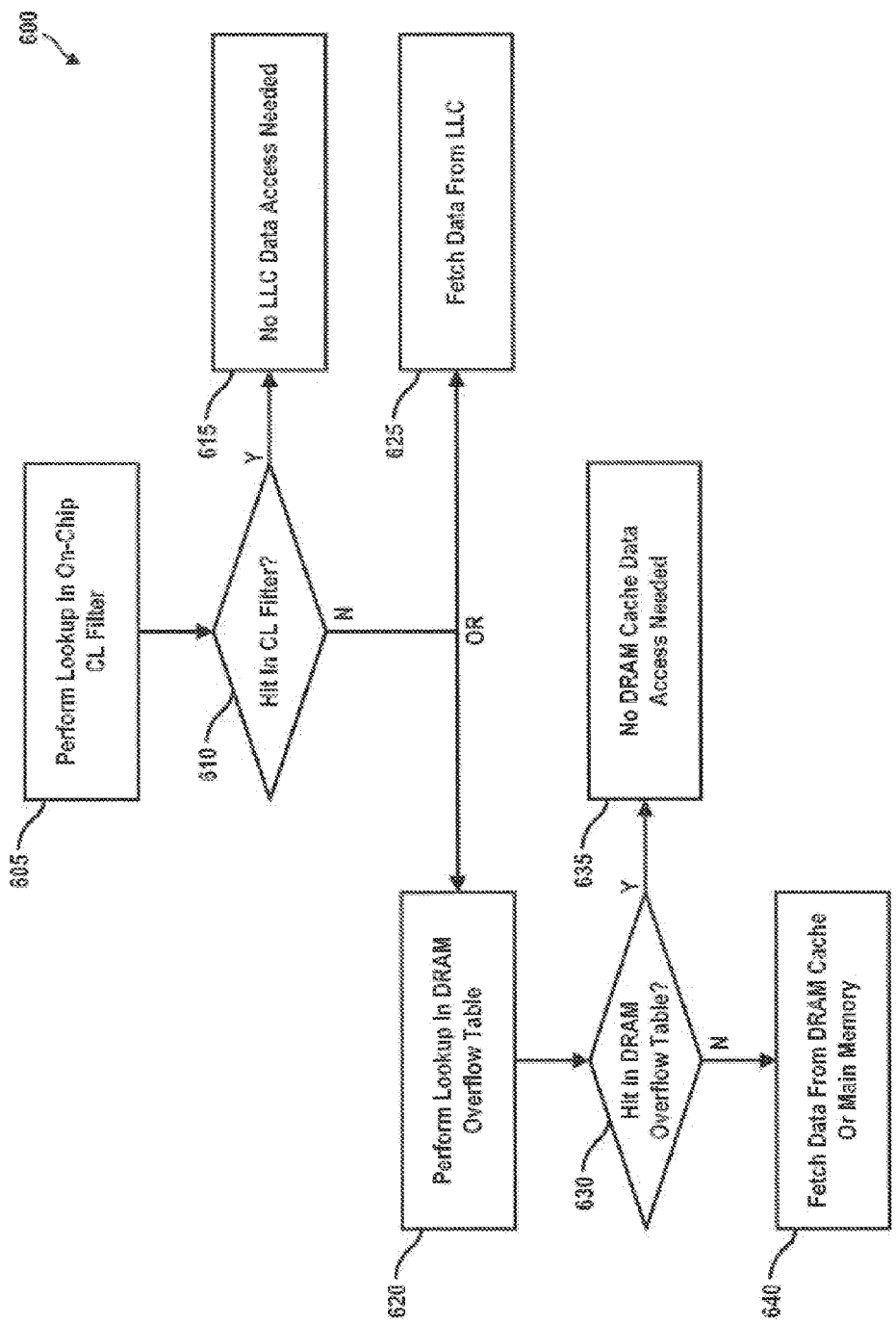
FIG. 6 is a flowchart illustrating an example method for memory de-duplication during a read operation according to one or more embodiments described herein.

FIG. 6 is an example process for memory de-duplication during a memory read operation in accordance with one or more embodiments described herein. Various details about one or more of blocks 605-640 in the example process 600 for memory de-duplication during a read operation were previously provided above.

Figure 7:
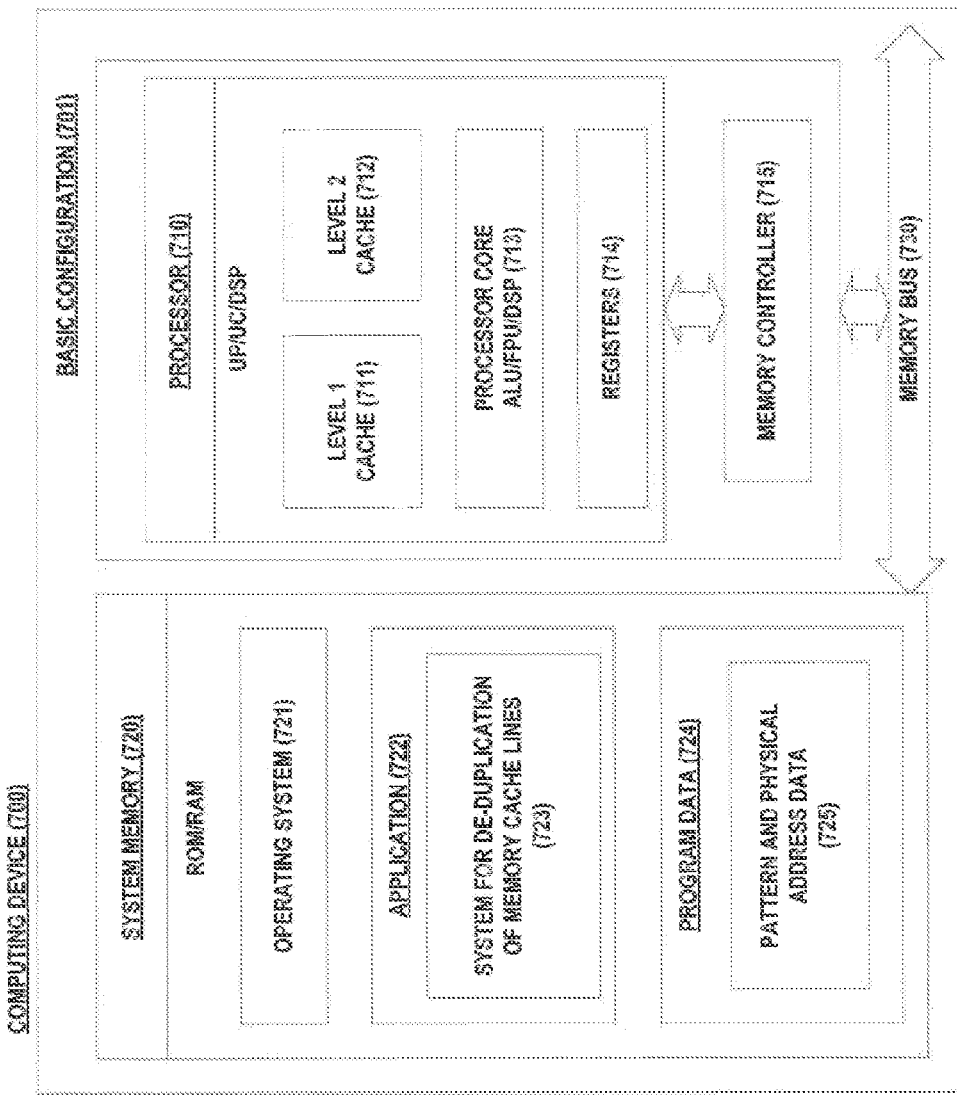
FIG. 7 is a block diagram illustrating an example computing device arranged for de-duplication of cache lines in a memory according to one or more embodiments described herein.

FIG. 7 is a high-level block diagram of an exemplary computer (700) that is arranged for providing de-duplication of cache lines in a memory. For example, in accordance with one or more embodiments described herein, the computer (700) may be configured to detect cache line data patterns and build a link-list between multiple physical addresses and their common data value, in a very basic configuration (701), the computing device (700) typically includes one or more processors (710) and system memory (720). A memory bus (730) was be used for communicating between the processor (710) and the system memory (720).

Depending on the desired configuration, the processor (710) can be of any type including bur not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a system (723) for de-duplication of memory cache lines.

Program Data (724) may include storing instructions that, when executed by the one or more processing devices, implement a system and method for de-duplicating memory cache lines. Additionally, in accordance with at least one embodiment, program data (724) may include pattern and physical address data (725), which may be used, for example, to detect duplicated data patterns in cache lines and maintain an address-data mapping instead of writing the duplicated data into the cache memory. In some embodiments, the application (722) can be arranged to operate with program data (724) on an operating system (721).

The computing device (700) can have additional features or functionality, and Additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium, (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for de-duplicating cache lines, the method comprising:
   detecting a data pattern in a write to a cache line;
   determining whether a physical location of the write matches a physical location in a last level cache;
   determining whether the data pattern in the write matches a data pattern associated with the physical location in the last level cache;
   determining whether a capacity of a cache line filter table has been reached; and
   in response to determining that the physical location of the write matches the physical location in the last level cache, that the data pattern in the write matches the data pattern associated with the physical location in the last level cache, and that the capacity of the cache line filter table has been reached:
      removing an older entry from the cache line filter table to an overflow table; and
      creating a new entry for the write in a space in the cache line filter table, the space resulting from the removal of the older entry.

2. The method of claim 1, further comprising:
   in response to determining that a physical location of another write is different than all utilized physical locations in the last level cache, that a data pattern in the other write matches a data pattern associated with a physical location in the last level cache, and that a capacity of the cache line filter table has been reached, creating a new entry for the other write in the overflow table.

3. The method of claim 1, further comprising:
   in response to determining that a physical location of another write is different than all utilized physical locations in the last level cache, and that a data pattern in the other write is different than all data patterns associated with the utilized physical locations in the last level cache, writing the other write to the last level cache.

4. The method of claim 1, wherein the new entry includes information about the physical location of the write and the data pattern detected in the write.

5. The method of claim 1, wherein the determining whether the capacity of the cache line filter table has been reached is based on two data structures within the cache line filter table.

6. The method of claim 5, wherein the determining whether the capacity of the cache line filter table is based on two data structures within the cache line filter table is based on a first data structure that defines most commonly duplicated data patterns and a second data structure that saves pattern numbers from the first data structure and addresses of physical locations for duplicated cache lines.

7. The method of claim 1, wherein the removing the older entry from the cache line filter table removes information identifying a data pattern and the data pattern's corresponding physical location as stored in an on-chip static random access memory cache.

8. A system for de-duplicating cache lines comprising:
   at least one processor; and
   a non-transitory computer-readable medium coupled to the at least one processor having instructions stored thereon that, when executed by the at least one processor, causes the at least one processor to:
      detect a data pattern in a write to a cache line;
      determine whether a physical location of the write matches a physical location in a last level cache;
      determine whether the data pattern in the write matches a data pattern associated with the physical location in the last level cache;
      determine whether a capacity of a cache line filter table has been reached; and
      in response to determining that the physical location of the write matches the physical location in the last level cache, that the data pattern in the write matches the data pattern associated with the physical location in the last level cache, and that the capacity of the cache line filter table has been reached:
         remove an older entry from the cache line filter table to an overflow table; and
         create a new entry for the write in a space of the cache line filter table, the space a result of the older entry being removed.

9. The system of claim 8, wherein the at least one processor is further caused to:
   in response to determining that a physical location of another write is different than all utilized physical locations in the last level cache, that a data pattern in the other write matches a data pattern associated with a physical location in the last level cache, and that a capacity of the cache line filter table has been reached, create a new entry for the other write in the overflow table.

10. The system of claim 8, wherein the at least one processor is further caused to:
    in response to determining that a physical location of another write is different than all utilized physical locations in the last level cache, and that a data pattern in the other write is different than all data patterns associated with the utilized physical locations in the last level cache, write the other write to the last level cache.

11. The system of claim 8, wherein the new entry includes information about the physical location of the write and the data pattern detected in the write.

12. The system of claim 8, wherein the determination of whether the capacity of the cache line filter table has been reached is based on two data structures within the cache line filter table, a first data structure that defines most commonly duplicated data patterns and a second data structure that saves pattern numbers from the first data structure and addresses of physical locations for duplicated cache lines.

13. The system of claim 8, further comprising an on-chip static random access memory cache to store data patterns identified by the cache line filter table.

14. The system of claim 8, further comprising a dynamic random access memory cache to store data patterns identified by the overflow table.

15. A method for de-duplicating cache lines during a memory read operation, the method comprising:
    performing a first lookup in a table of a cache line filter;

determining, based on the first lookup, whether a data pattern associated with a read request is available in the cache line filter;

in response to determining that the data pattern associated with the read request is not available in the cache line filter, performing a second lookup, the second lookup in an overflow table;

determining, based on the second look up, whether the data pattern associated with the read request is available in the overflow table; and in response to determining that the data pattern associated with the read request is available in the overflow table, obtaining the data pattern associated with the read request from the overflow table.

16. The method of claim 15, wherein performing the first lookup in the table of the cache line filter looks up entries identifying physical locations and data patterns stored in an on-chip static random access memory cache.

17. The method of claim 15, wherein performing the second lookup in the overflow table looks up entries identifying physical locations and data patterns stored in a dynamic random access memory cache.

18. The method of claim 15, further comprising obtaining the data pattern associated with the read request from main memory in response to determining that the data pattern associated with the read request is not available in the overflow table.

* * * * *

UNITED STATES PATENT AND TRADEMARK OFFICE
CERTIFICATE OF CORRECTION

PATENT NO. : 9,785,571 B2
APPLICATION NO. : 14/877523
DATED : October 10, 2017
INVENTOR(S) : Shinye Shiu Page 1 of 1

It is certified that error appears in the above-identified patent and that said Letters Patent is hereby corrected as shown below:

On the Title Page

Line 9 of the Abstract, after "for" before "duplicated" delete "she" insert --the--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*